US006930997B1

(12) United States Patent
Sasuta et al.

(10) Patent No.: US 6,930,997 B1
(45) Date of Patent: Aug. 16, 2005

(54) METHOD AND APPARATUS FOR PROCESSING SERVICES IN COMMUNICATION SYSTEM

(75) Inventors: Michael Sasuta, Mundelein, IL (US); Daniel McDonald, Cary, IL (US); Mark Shaughnessy, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/014,525

(22) Filed: Jan. 28, 1998

(51) Int. Cl.[7] ............................................. H04L 12/66
(52) U.S. Cl. ................. 370/352; 370/401; 379/221.06; 455/418
(58) Field of Search ................................ 370/401, 465, 370/395.5, 310.2, 327; 455/418, 419, 420; 709/201, 202, 203, 205, 313

(56) References Cited

U.S. PATENT DOCUMENTS

| 5,564,070 | A | * | 10/1996 | Want et al. .................. 370/401 |
| 5,603,054 | A | * | 2/1997 | Theimer et al. ............. 709/205 |
| 5,742,668 | A | * | 4/1998 | Pepe et al. ................... 455/415 |
| 5,754,953 | A | * | 5/1998 | Briancon et al. ............ 455/418 |
| 5,974,238 | A | * | 10/1999 | Chase, Jr. .................... 709/203 |

OTHER PUBLICATIONS

Bakre et al, M-RPC: A Remote Procedure Call Service for Mobile Clients, Rutgers University, pp. 1-13, 1995.*
Hodes et al, Composable Ad-Hoc Mobile Services for Universal Interaction, University of California at Berkeley, pp. 1-12, Aug. 2, 1997.*

* cited by examiner

*Primary Examiner*—Frank Duong
(74) *Attorney, Agent, or Firm*—Christopher P. Moren; Terri S. Hughes; Indira Saladi

(57) ABSTRACT

A determination is made whether a service provider (28, 40) is capable of supporting at least one service for one of a plurality of subscriber units (30–36, 42–46). The determination is based on whether the service provider has sufficient processing capabilities and memory to receive the service processing software from the subscriber unit and/or whether the service provider is authorized, based on communication system policies to process the particular service request for this subscriber. If the service provider is capable, the subscriber unit provides service processing logic (e.g., the service processing application and/or user customization software) to the service provider. Upon receiving the service processing logic, the service provider stores it and eventually executes it to process the requested service for the subscriber units.

17 Claims, 4 Drawing Sheets

METHOD AND APPARATUS FOR PROCESSING SERVICES IN COMMUNICATION SYSTEM

TECHNICAL FIELD OF THE INVENTION

The present invention relates generally to communication systems and more particularly to processing services within such communication systems.

BACKGROUND OF THE INVENTION

Communication systems are known to include a plurality of communication devices that communicate with each other via supporting infrastructure. Each communication device has an individual access code that distinguishes it from other communication devices. Based on the individual access code, the supporting infrastructure can individually process individual service requests for a communication device. In a typical wireless communication system, a communication device can request a plurality of services that include cellular telephony services (e.g., one-to-one communications, call waiting, call forwarding, three-way calling, etc.), and land mobile communication services (e.g., one to many communications, a dispatcher communicating with an individual communication device and/or a group of communication devices).

In a typical wireless communication system, a communication device (or subscriber unit) is a cellular telephone, mobile radio, portable radio, personal digital assistance ("PDA"), a personal computer equipped with a wireless modem, a device that transceives data via a wireless communication path, or any combination thereof. The supporting infrastructure includes a plurality of base stations, groups of which are coupled to a base station controller. Groups of base station controllers are coupled to service processors, which are coupled to a public switched telephone network ("PSTN"). The service processors may be mobile switching centers, dispatch service processors, or mobile data gateways. When communication devices are located in a communication area that includes a mobile switching center, a dispatch service processor, and/or a mobile data gateway, the communication devices have access to group communication services, private communication services, telephony services, dispatch services, and/or data transfer services.

To access these services, a communication device transmits an inbound signaling word ("ISW"), where the ISW includes the communication device's individual access code and an indication of the particular service being requested. The requested service is routed to the appropriate service provider. The service provider processes the request based on locally stored service processing software. Once the service is processed, the requesting communication device is provided with the service. With this centralized approach to service processing, a plurality of communication devices can access only the services offered in a given communication area, even if the communication devices are capable of accessing more services. In addition, centralized service processing provides the same services, in the same manner to the communication devices. Thus, it does not allow communication devices to have the services processed for them in a customized manner. If customizations were allowed, the centralized service processor would have to include additional memory and processing capabilities to process the customized service requests.

In computer networks, and through the Internet, computers may download a portion of a computer application. With downloaded application, a computer user may customize the application. For example, in Java applications, computer users are allowed to download portions of applications to their computers and then customize from there. While this approach provides added flexibility to end-users, it is still a centralized approach to service processing and is generally not application to communication systems since communication device users do not want to program their devices each time they request a service.

Therefore, a need exists for a method and apparatus that decentralizes processing of service requests in communications systems and allows users to customize their service requests.

DESCRIPTION OF A PREFERRED EMBODIMENT

Generally, the present invention provides a method and apparatus for decentralized processing of communication services. This is accomplished by determining whether a service provider is capable of supporting at least one service for one of a plurality of subscriber units. Such a determination is based on whether the service provider has sufficient processing capabilities and memory to receive the service processing software from the subscriber unit and/or whether the service provider is authorized, based on communication system policies to process the particular service request for this subscriber. If the service provider is capable, the subscriber unit provides service processing logic (e.g., the service processing application and/or user customization software) to the service provider. Upon receiving the service processing logic, the service provider stores it and eventually executes it to process the requested service for the subscriber units. With such a method and apparatus, communication services may be processed in a decentralized manner. By decentralizing the processing of services in this manner, subscriber units are given more flexibility as to the customizations of these services they access and substantially eliminates a roaming subscriber being denied service processing because the roamed into communication area does not currently support the requested service.

Figure 1:
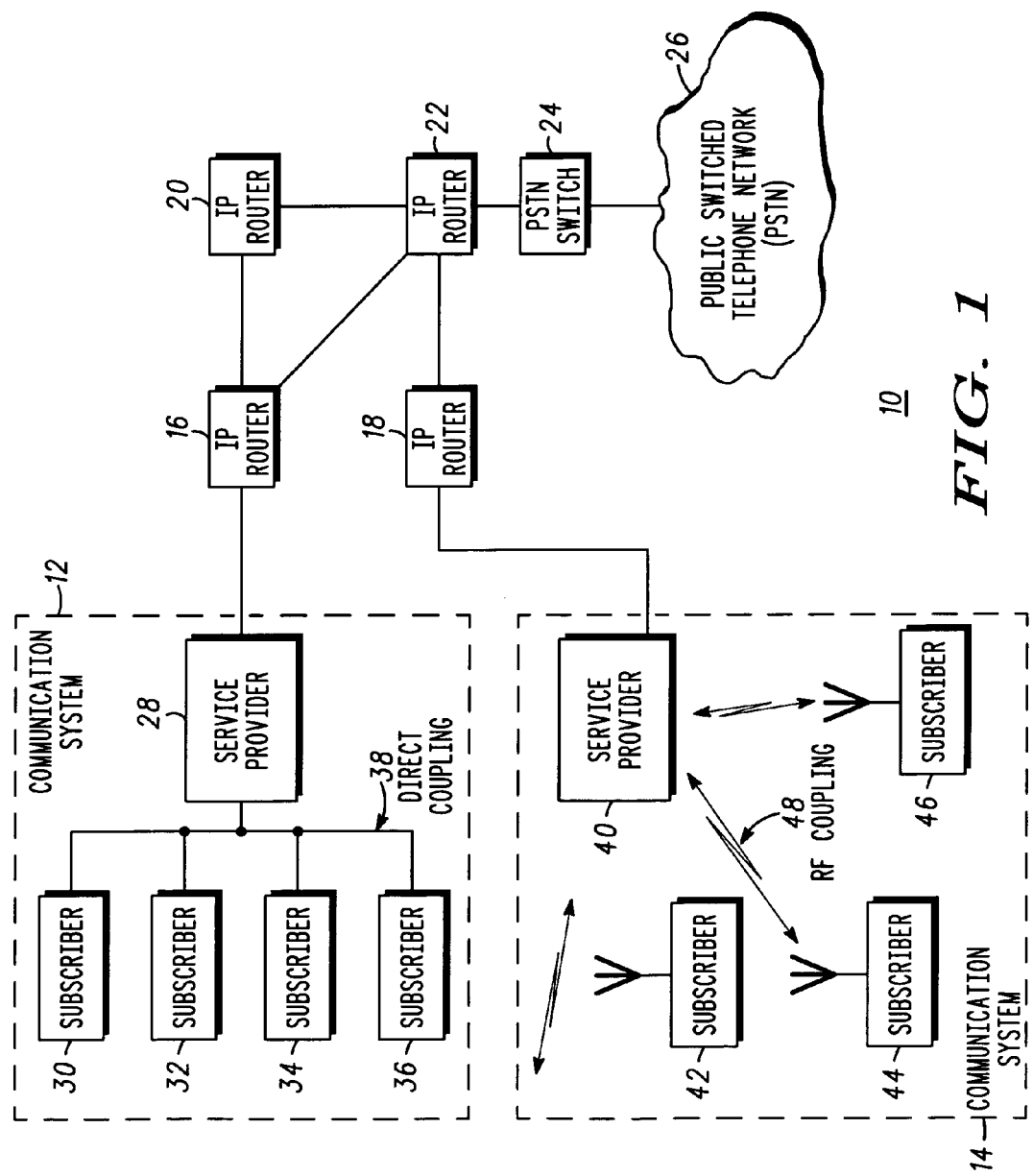
FIG. 1 illustrates a schematic block diagram of a communication system in accordance with the present invention.

The present invention can be more fully described with reference to FIGS. 1–5. FIG. 1 illustrates a schematic block diagram of a communication environment 10 that includes a plurality of communication system 12 and 14, a plurality of IP routers, 16–22, a public switched telephone network ("PSTN") 26 and a PSTN switch 24. The IP (Internet Protocol) routers 16–22 allow communication devices, communication entities, or any other device that contains an IP address, to communicate via the Internet and/or the PSTN.

Communication system 12 is shown to include a plurality of subscriber units 30–36 that are directly coupled 38 to a service provider 28. Each of the subscriber units 30 may be personal computers, workstations, laptop computers, or any other device that directly couples (or indirectly couples via a local area network) to a service provider. The service provider 28 may be a computer or workstation that functions as a service provider. To function as a service provider, the workstation or computer, includes a processing unit, such as a central processing unit, microprocessor, micro-controller, etc., that executes programming instructions. The programming instructions, which constitute a service application, may be downloaded from the subscriber units and stored within the service provider. The manner in which the service application is stored is based on commands provided by the subscriber unit, and/or established by storage parameters that are derived from the communication system's policies. The storage parameters and subscriber commands will be discussed with reference to FIGS. 2–5. Note that the service provider 28 may be capable of processing only a single service request at a time or it may be capable of processing a multitude of service requests at a time.

The service provider 28 is coupled to IP router 16, such that the service provider acts as a gateway for the subscriber units to other communication systems (e.g., communication system 14), to other entities coupled to IP routers (e.g., content providers databases, etc.), and to the public switch telephone network 26. As such, the subscriber units 30–36, via the service provider 28, can communicate with any other subscriber or entity coupled to the communication environment 10.

Communication system 14 includes a plurality of wireless subscriber units 42–46 that communicate over RF (radio frequency) communication paths 48 to a service provider 40. The subscriber unit 42–46 may be land mobile communication devices, mobile radios, portable radios, cellular telephones, computers equipped with a wireless modem, and/or a device that processes digital information and includes a wireless receiver and/or transmitter. The service provider 40 includes an RF transmitter and/or receiver such that it may communicate with the plurality of wireless subscriber units 42–46. In addition, the service provider 40 includes a computing device and memory. The computing device allows the service provider to obtain software applications from the subscriber units, store them in the memory, and subsequently execute the requested services for at least one of the plurality of subscriber units. As with service provider 28, service provider 40 may be a computer that processes a single service request at a time or hundreds of service requests at a time. Note that service provider 28 and 40 may each be comprised of a plurality of computing devices, where each of the computing devices is coupled to an independent IP router or to the same IP router.

Figure 2:
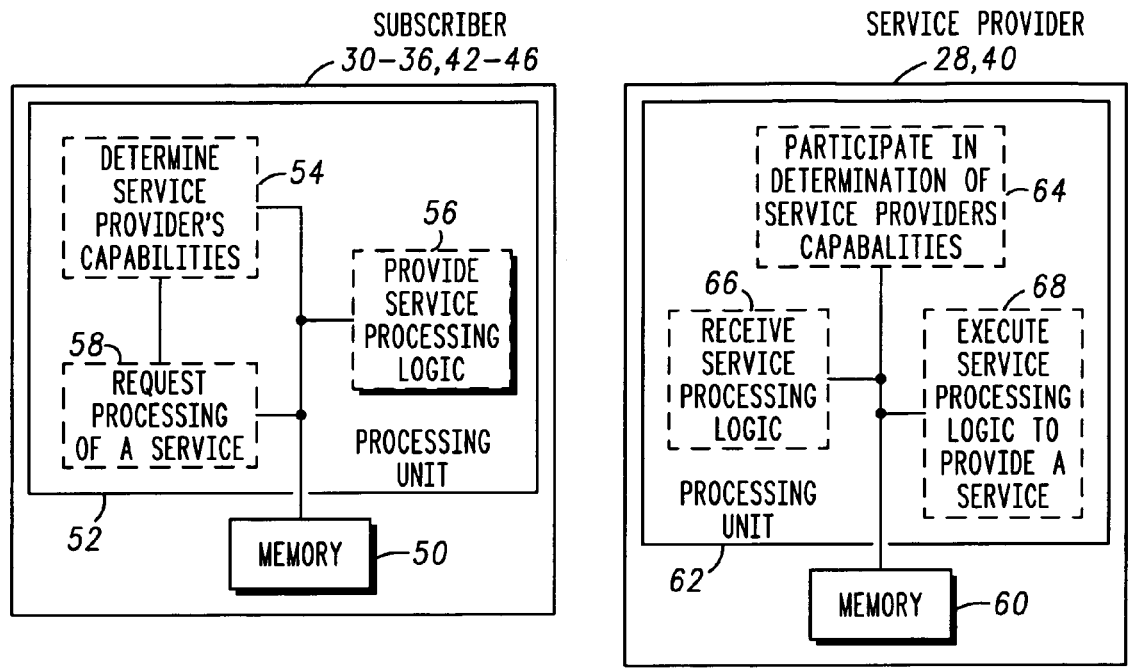
FIG. 2 illustrates a schematic block diagram of a subscriber unit and service processor in accordance with the present invention.

FIG. 2 illustrates a schematic block diagram of subscribers 30–36 and 42–46 and a schematic block diagram of service providers 28 and 40. Each of the subscriber units, even though they transfer data via different mediums (i.e., RF and direct connect), includes a processing unit 52 and memory 50 to process the aspects of the present invention. The processing unit 52 may be a microprocessor, microcontroller, digital signal processor, central processing unit, microcomputer, and/or any device that manipulates digital information based on programming instructions. The memory 50 may be a read-only memory, random access memory, floppy disk memory, hard disk memory, CD ROM memory, DVD memory, and/or any other device that stores digital information in a retrievable manner.

Memory 50 stores programming instructions that, when read by the processing unit 52, causes the processing unit 52 to function as a plurality of circuits 54–58. When the processing unit 52 is reading the programming instructions, it functions as a circuit 54 for determining the service provider's capabilities. If, as circuit 54, the processing unit 52 determines that the service provider is capable of handling a particular service processing logic for the subscriber unit, the processing unit 52 then reads programming instructions that cause it to function as circuit 56. As circuit 56, the processing unit 52 modifies service processing logic at the service provider. The service processing logic is stored in memory 50 and may include the entire software application to process a particular service and/or customize custom user parameters. The processing unit then functions as circuit 58 to request processing of the particular service. The functionality of the processing unit, while executing the programming instructions stored in memory 50, will be discussed in greater detail with reference to FIGS. 4 and 5.

The service provider 28, 40 includes a processing unit 62 and memory 60. The processing unit 62 may be a microcontroller, microprocessor, digital signal processor, microcomputer, central processing unit and/or any device that manipulates digital information based on programming instructions. The memory 60 may be random access memory, magnetic tape memory, floppy disk memory, hard drive memory, DVD memory, CD memory, and/or any other device that stores digital information in a retrievable fashion.

The memory 60 stores programming instructions that, when read by the processing unit 62, causes the processing unit to function as a plurality of circuits 64–68. When the processing unit 62 is reading the programming instructions, it functions as circuit 64 such that it participates in a determination of the service provider's capabilities. Such capabilities will be subsequently described with reference to FIGS. 4 and 5. Having determined the service provider's capability, the processing unit 62 reads programming instructions that cause it to function as circuit 66. As circuit 66, the processing unit 62 receives the service processing logic and subsequently stores it in memory 60. Having done this, the processing unit 62 then functions as circuit 68 to execute the servicing processing logic and to provide the service upon request of the subscriber unit. Circuit 68 further causes the service processing logic to be maintained in memory, determines who can access the particular service, and determines how long it should be maintained. The functionality of the service provider while executing these programming instructions will be discussed in greater detail with reference to FIGS. 4 and 5.

Figure 3:
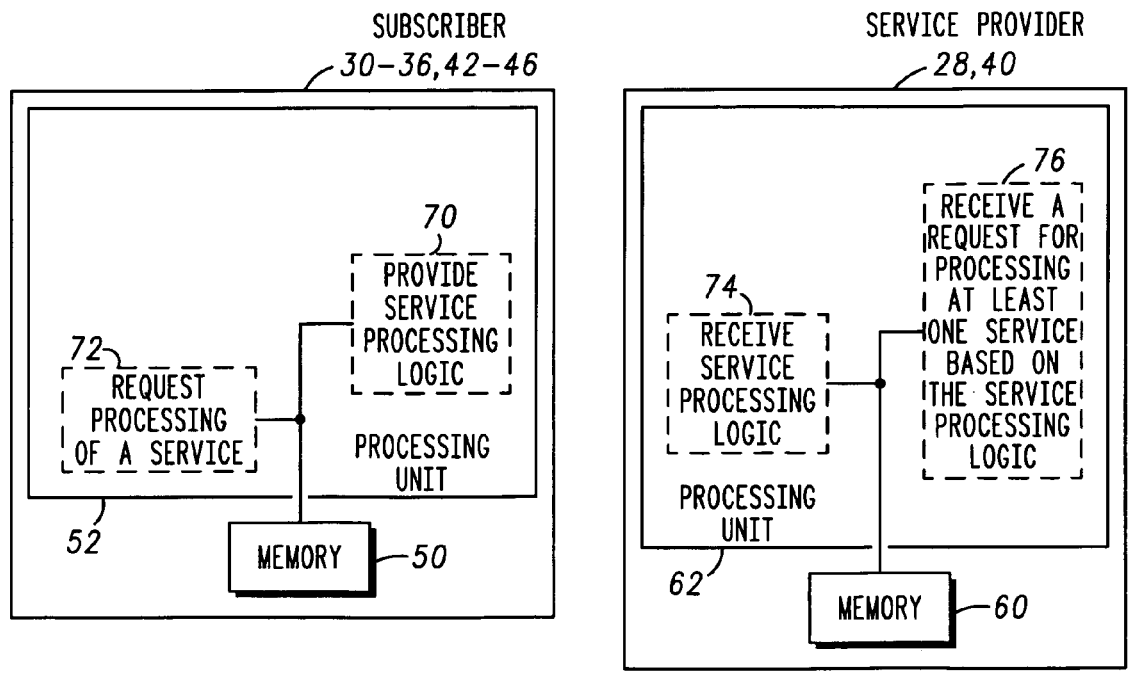
FIG. 3 illustrates a schematic block diagram of an alternate subscriber unit and alternate service processor in accordance with the present invention.

FIG. 3 illustrates an alternate schematic block diagram of subscriber's 30–36 and 42–46 and the service providers 28 and 40. The subscriber units 30–36 and 42–46 include the processing unit 52 and memory 50. The memory, however, stores different programming instructions that cause the processing unit to function as circuit 70 and 72. When the processing unit 52 is reading the programming instructions, it functions as circuit 70 to provide service processing logic to the service provider. The processing unit 52 then functions as circuit 72 to request the processing of the particular service.

The service providers 28, 40 include the processing unit 62 and memory 60. Memory 60 includes programming instructions that cause the processing unit 62 to function as circuit 74 and 76. While functioning as circuit 74, the processing unit 62 receives the service processing logic from the subscriber unit. Upon receiving this information, the processing unit causes the service processing logic to be stored in memory 60. The processing unit further causes the service processing logic to be maintained in memory, determines who can access the particular service, and determines how long it should be maintained. Next, the processing unit functions as circuit 76 to receive a request for processing at least one service and to execute the service processing logic to fulfill the service request.

Figure 4:
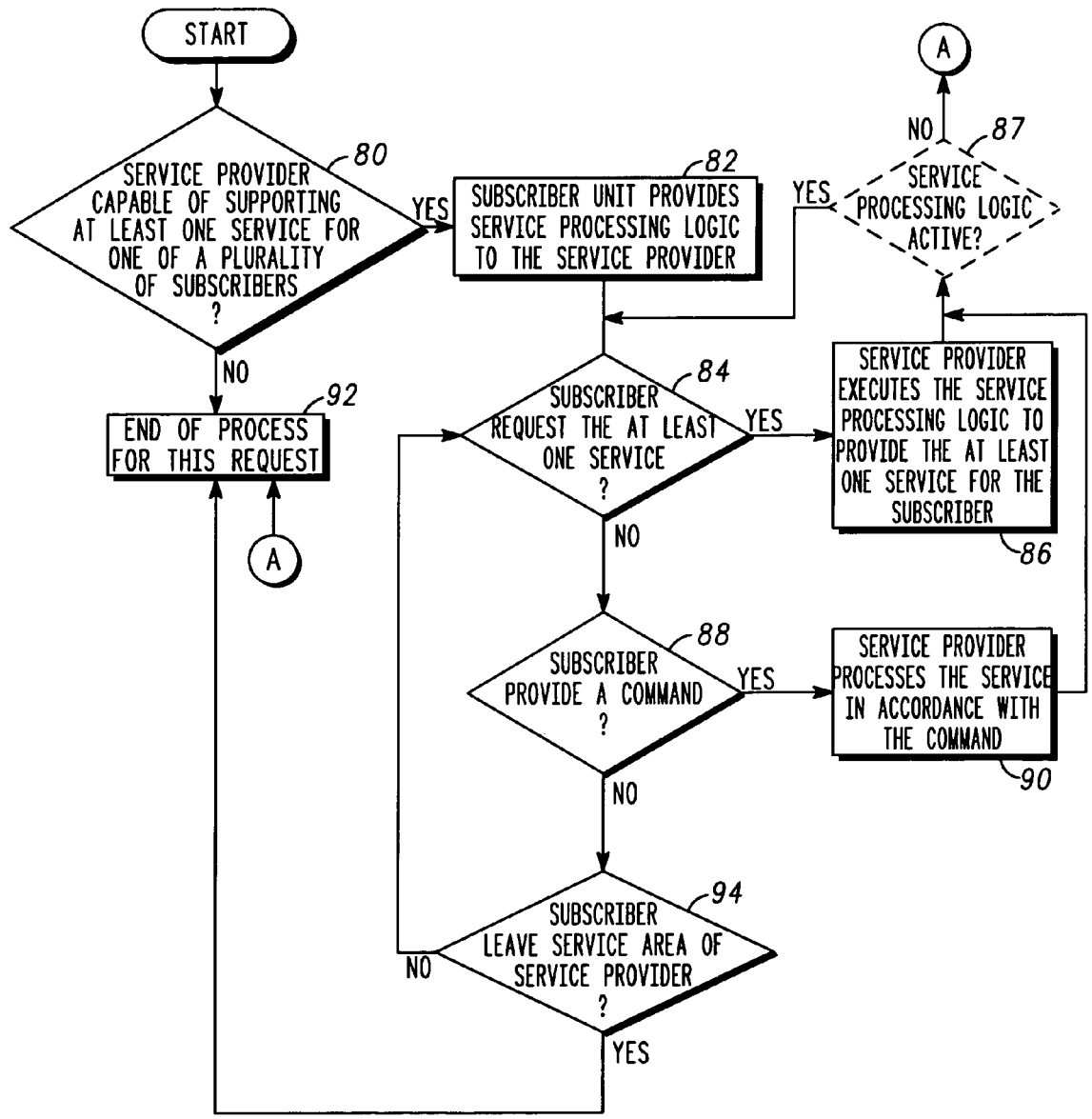
FIG. 4 illustrates a logic diagram of a method for decentralized processing of service requests in accordance with the present invention.

FIG. 4 illustrates a logic diagram of a method for decentralized processing of service requests in a communication system. The process begins at step 80 where a determination is made as to whether the service provider is capable of supporting at least one service for a requesting one of a plurality of subscriber units. The determination may be done at service registration and/or at service invocation. If done at service registration, the service provider and/or the subscriber unit determines whether the service provider is capable of supporting the subscriber's services when the subscriber unit registers with the service provider. If the determination is done at service invocation, the subscriber unit and/or service processor determines whether the service provider is capable of supporting the requested service when the service is requested.

As mentioned, the subscriber and/or the service provider may determine the service provider's capabilities. For example, the service provider provides an indication of its capabilities to the requesting subscriber unit at service registration or service invocation. The indication of capabilities would indicate which services the service provider can support, processing capabilities, and/or communication system policy restrictions. Such services include, but are not limited to, cellular telephony services, group communications, group dispatch, data packet communications, and/or digital and/or analog communication supporting infrastructure. As such, a service provider may be incapable of providing digital services for a subscriber unit when it is only capable of providing analog services. The processing capabilities would indicate the type of device that processes the downloaded software applications (e.g., a 200 MHz microprocessor), memory capabilities, and/or available memory and processing. The communication system policy restrictions would include service processing prioritization (e.g., emergency calls are processed first, short messages are processed first, etc.) and/or subscriber access restrictions (e.g., a subscriber is not authorized to access a particular service). The subscriber unit, upon receiving the indication of capabilities, determines the service provider's capabilities.

As an alternate method for determining the service provider's capabilities, the subscriber unit may send the service provider an indication of its service requirements. Such service requirements may include, but are not limited to, cellular telephony, land/mobile communications, data packet transmissions, and dispatch services. Upon receiving the indication of service requirements, the service provider determines whether it is capable of supporting the services. If the service provider is not capable of supporting all of the services, it replies to the subscriber unit indicating the services it is capable of supporting or the services it cannot support.

The determination of the service provider's capabilities may further include verifying that the service provider is an authentic service provider. This can be done by reviewing the communication system policies to verify that the service provider has been identified as an authentic service provider. Alternatively, the service provider may include security access parameters, such as public key, that a subscriber uses to verify the authenticity of the service provider.

If, at step 80, the service provider is not capable of supporting the requested service, the process proceeds to step 92 where the process is complete for this particular service request. Note that the process of FIG. 4 is performed continually for each service request provided by each subscriber unit. As such, the service provider may be simultaneously executing the steps of FIG. 4 for a plurality of subscriber units each requesting a different service.

If the service provider is capable of supporting the requested service, the process proceeds to step 82, where the subscriber unit provides service processing logic to the service provider. If the service provider includes a service application, the service processing logic includes only custom user parameters, which modify the service application to meet customization requirements of the subscriber unit. As such, a user is provided with much greater flexibility to individualize the processing of its service requests. If, however, the service provider does not include the service application, the subscriber unit provides the service application and the custom user parameters as the service processing logic. By having the subscriber provide the service processing logic, a subscriber can access its services within any communication area with which it is affiliated and the subscriber is not restricted to accessing only the services provided by the communication area.

The subscriber unit may provide the service processing logic at service registration or service invocation. Note that the service processing logic may include maintenance duration, inter-working information, home location information, or a plurality of disposition commands. The maintenance duration information includes either a minimum time that the service provider is to maintain the service processing logic or a maximum time for maintaining the service processing logic. The inter-working information indicates to the service provider how to interconnect with other entities within the communication environment. For example, if the subscriber uses a particular long distance carrier, Internet provider, etc., the inter-working information would include this information. The inter-working information may also indicate which IP routers are to be used to process the service request. The home location information includes the subscriber unit's ID, the subscriber unit's services that it has subscribed to, and may also include similar information for other subscribers.

Having provided the service processing logic to the service provider, the process proceeds to step 84. At step 84, a determination is made as to whether the subscriber unit has requested the at least one service. If so, the process proceeds to step 86 where the service provider executes the service processing logic to provide the at least one service for the subscriber. Note that the execution of the service processing logic would include verifying that the processing is done in accordance with any commands provided by the subscriber unit. If, however, the subscriber unit has not provided a request for the service, the process proceeds to step 88.

At step 88, a determination is made as to whether the subscriber unit has provided a command to the service provider. If so, the process proceeds to step 90 where the service provider processes subsequent service requests in accordance with the command. The command may indicate deletion parameters that inform the service provider on how to delete the service processing logic. As such, the commands may have the service provider erase the service processing logic from memory after a time out period, when the subscriber leaves the service area of the service provider, and/or when members of the subscriber's group leave the service area. The commands may also have the service delete the lowest priority services when processing and memory availability of the service provider is exceeded. The commands may further indicate that the service provider is to inactivate the service processing logic such that a subsequent command can re-activate the service processing logic. The commands may further indicate that the service processor is to process the service processing logic only for the subscriber unit that provided it.

As an alternate command, the subscriber unit may indicate that the service processing logic may be processed for a group of subscribers that are associated with the providing subscriber unit. As yet another command, the subscriber unit may indicate that there are no restrictions on processing the service processing logic such that the service provider may provide the service to any subscriber. As yet a still further command, the subscriber unit may identify particular other subscriber units for whom the service provider may provide the service. By allowing the subscriber units to include these commands, subscribers have greater flexibility as to how their services are to be performed and what other subscriber units may access these services.

Having processed the service in accordance with the command, the process proceeds to step 87, where a determination is made as to whether the service processing logic is still active. Recall that a command may instruct the service provider to maintain the service processing logic for a specific duration and may also instruct the service provider to provide the service only to the original subscriber unit, the subscriber unit's talk group, specific subscribers, and/or all subscribers. If the service processing logic is still active, the process repeats at step 84. If not, the process proceeds to step 92 where the processing of this particular request ends.

If, at step 88, the subscriber unit has not provided a command, the process proceeds to step 94 where a determination is made as to whether the subscriber has left the service area of the service provider. If not, the process waits at step 84, 88 and 94 for such an event to occur. If the subscriber has left the service area of the service provider, the process proceeds to step 92. At step 92 the process ends for this particular request. Note that just because the subscriber has left the service area of the service provider, the service provider does not have to delete the service processing logic from its memory. Such would be indicated in one of the commands provided to the service provider by the subscriber or dictated by the communication system policy.

Figure 5:
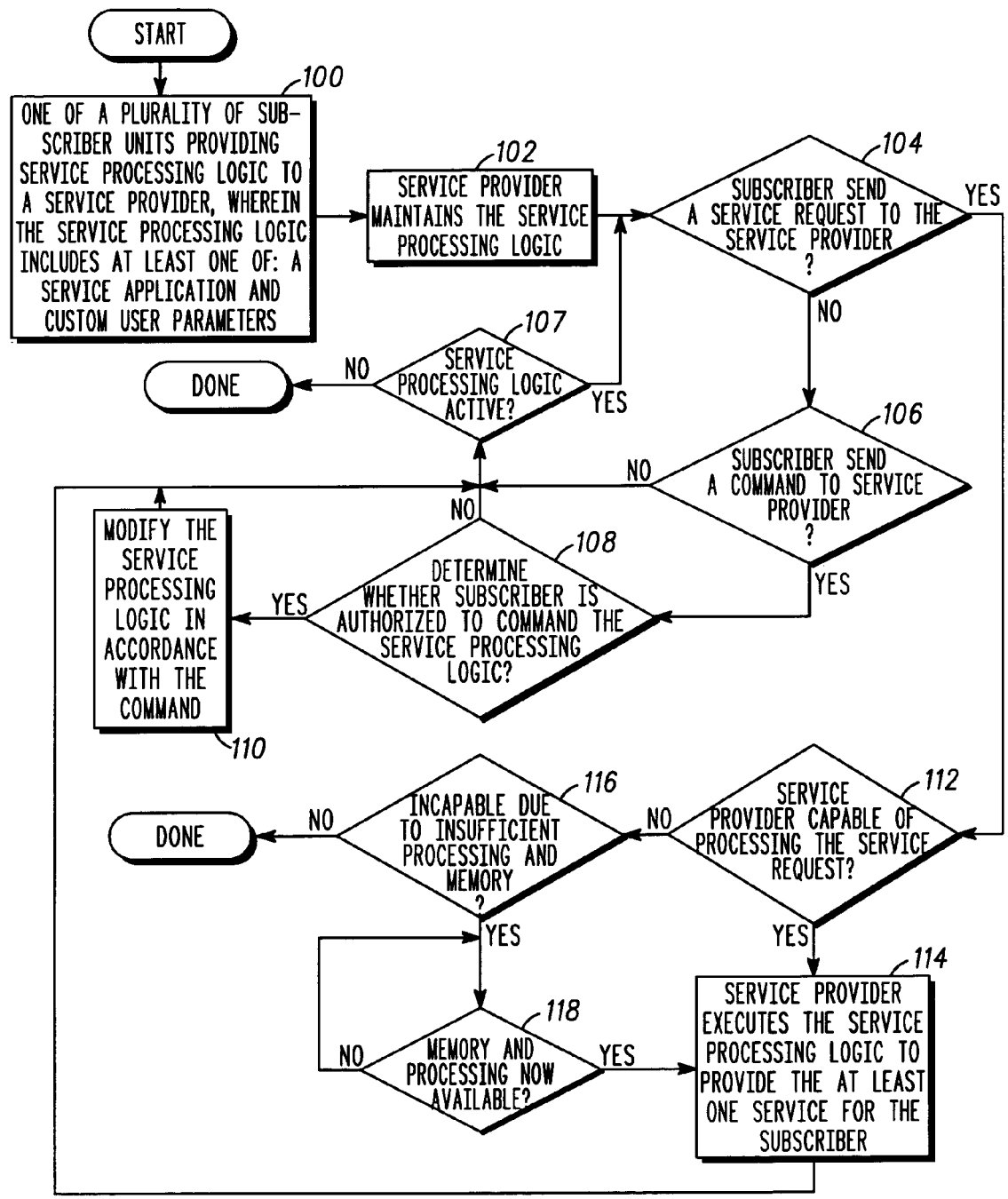
FIG. 5 illustrates a logic diagram of an alternate method for decentralized processing of service requests.

FIG. 5 illustrates a logic diagram of an alternate method for decentralized processing of services. The process begins at step 100 where one of a plurality of subscriber units provides service processing logic to a service provider. The service processing logic includes at least one of a service application and custom user parameters. The service application is programming instructions that would be read and executed by the service provider to perform a particular service. The custom user parameters are customized programming instructions that alter the service application programming instructions to meet the particular subscriber's requirements. The process then proceeds to step 102 where the service provider maintains the service processing logic. Typically, the service provider will store the service processing logic in memory based on commands provided by the subscriber and/or communication system policies.

The process then proceeds to step 104 where a determination is made as to whether the subscriber has sent a service request to the service provider. If so, the process proceeds to step 112 where a determination is made as to whether the service provider is capable of processing the service requests. If yes, the process proceeds to step 114 where the service provider executes the service processing logic to provide the at least one service for the subscriber.

If at step 104, it is determined that the subscriber has not sent a service request, the process proceeds to step 106. At step 106, a determination is made as to whether the subscriber unit has sent a command to the service processor. If not, the process proceeds to step 107 where a determination is made as to whether the service processing logic is still active. If not, the process is done. If the service processing logic is still active, the process waits until either a service request or command has been sent. Once a command has been sent, the process proceeds to step 108. At step 108, a determination is made as to whether the subscriber is authorized to command disablement, or alteration of the service processing logic. If not, the command is not processed and the process reverts to step 107. If, however, the subscriber is authorized, as determined in accordance with communication system policies, the process proceeds to step 110.

At step 110, the service processing logic is disabled, or modified, in accordance with the command. In addition, the service provider may disable the service processing logic based on deletion parameters that are established in accordance with the communications system policies, which are established by a system administrator or policy authority administrator. The deletion parameters may indicate that service processing logic is to be deleted after a time-out period, is to be deleted in favor of a higher priority service processing logic, or is to be deleted when the service processor has exceeded its processing and/or memory availability, number of times the service has been executed exceeds a threshold, and/or lack of activity for a given duration. As such, the service provider will maintain a current activation/deactivation of the service processing logic in accordance with the commands provided by the subscriber and/or in accordance with communication service policies. Once the service provider has disabled or modified the service processing logic in accordance with the command, the process proceeds to step 107.

If, at step 112, it was determined that the service provider is not capable of processing the service requests, the process proceeds to step 116. At step 116 a determination is made as to whether the service provider's incapability of processing the request is due to insufficient processing and/or memory availability. The determination may further be based on whether the system has sufficient communication resources to support the service. If not, the processes is complete for this particular service request and the request will not be fulfilled. If, however, the incapability is due to insufficient processing and/or memory, the process proceeds to step 118. At step 118, the request is queued until the processing and/or memory is available.

The preceding discussion has presented a method and apparatus for decentralized processing of service requests in a communication system. In essence, the present invention shifts the intelligence of service processing to the end-users such that the infrastructure is dependent upon the subscribers. As such end-users are provided with greater flexibility in customizing how particular services are processed for them. Further, subscriber unite are more likely to have their full set of features available to them at any site since they provide the software to the service providers. In centralized implementations, the subscriber units are limited to services that the service providers are capable of supporting.

We claim:

1. In a communication system that comprises a service provider and a subscriber, a method for processing services comprises the steps of:
   indicating to the subscriber that the service provider is capable of supporting a service;
   receiving service processing logic from the subscriber to allow the service provider to provide the service;
   executing the service processing logic received from the subscriber to provide the service to the subscriber based on the service processing logic when the service has been requested; and storing a service application, and wherein the service processing logic comprises custom user parameters, wherein the custom user parameters modify the service application to meet customization requirements of the subscriber.

2. The method of claim 1 wherein the step of indicating is performed upon receipt of at least one of: a service registration from the subscriber and a service invocation from the subscriber.

3. The method of claim 1 further comprising the steps of:
   receiving a request for the service from a second subscriber; and
   executing the service processing logic received from the subscriber to provide the service to the second subscriber.

4. The method of claim 1 further comprising the steps of:
   receiving an indication of service requirements for the subscriber; and
   determining whether the service provider is capable of supporting the service based on the indication of service requirements.

5. The method of claim 1 further comprising the step of receiving authentication from the subscriber to allow the service provider to support the service.

6. The method of claim 1 wherein the service processing logic comprises a service application and custom user parameters that relate to the service.

7. The method of claim 6 further comprising the step of queuing the service when at least one of: the service provider has insufficient processing and memory, and the communication system has insufficient communication resources.

8. The method of claim 1 further comprising the step of deleting the service processing logic based on deletion parameters, wherein the deletion parameters comprise at least one of: a time out period, service priority, processing and memory availability, number of times the at least one service has been executed exceeds a threshold, and lack of activity.

9. The method of claim 1 further comprising the steps of:
   receiving a command from the subscriber; and
   disabling the service processing logic in response to the command when the subscriber is authorized to command disablement of the service processing logic.

10. The method of claim 9 further comprising the step of disabling the service processing logic by at least one of: erasure and inactivation.

11. The method of claim 10 further comprising the step of, when the service processing logic was disabled by inactivation, subsequently receiving a second command from the subscriber to reactivate the service processing logic.

12. In a communication system that comprises a service provider and a subscriber, a method comprising the steps of:
    determining that the service provider is capable of supporting a service;
    sending service processing logic to the service provider to allow the service provider to provide the service;
    receiving the service based on the service processing logic from the service provider when the service is requested; and wherein the service processing logic comprises custom user parameters, wherein the custom user parameters modify a stored at the service provider to meet customization requirements of the subscriber.

13. The method of claim 12 further comprising the steps of:
    receiving an indication of capabilities of the service provider; and
    determining whether the service provider is capable of supporting the service based on the indication of capabilities.

14. The method of claim 12 wherein the service processing logic comprises at least one of a service application and custom user parameters that relate to the service.

15. The method of claim 12 further comprising the step of sending an indication of service requirements to the service provider.

16. The method of claim 12 further comprising the step of sending a disable command to the service provider to disable the service provider from providing the service based on the service processing logic.

17. The method of claim 12 further comprising the step of authenticating the service provider to allow the service provider to support the service with the service processing logic.

* * * * *